United States Patent [19]

Baumbach

[11] 4,168,515

[45] Sep. 18, 1979

[54] LINE PROTECTOR FOR A COMMUNICATIONS CIRCUIT

[75] Inventor: Bertram W. Baumbach, Arlington Heights, Ill.

[73] Assignee: Reliable Electric Company, Franklin Park, Ill.

[21] Appl. No.: 880,390

[22] Filed: Feb. 23, 1978

[51] Int. Cl.² .............................................. H02H 3/22

[52] U.S. Cl. ................................... 361/124; 361/119; 337/32

[58] Field of Search ............... 361/119, 124, 117, 120, 361/118; 337/31-34, 15, 17, 18, 28, 29

[56] References Cited

U.S. PATENT DOCUMENTS

| | | | |
|---|---|---|---|
| 3,255,330 | 6/1966 | MacKenzie et al. | 337/32 |
| 3,281,625 | 10/1966 | Wanaselja | 361/124 X |
| 3,573,695 | 4/1971 | Geyer et al. | 337/32 X |
| 3,587,021 | 6/1971 | Baumbach | 337/32 |
| 3,743,888 | 7/1973 | Baumbach | 361/119 |
| 3,818,271 | 6/1974 | Baumbach | 361/119 X |
| 3,849,750 | 11/1974 | Baumbach et al. | 361/119 X |
| 3,889,221 | 6/1975 | Heisinger | 337/15 |
| 3,947,730 | 3/1976 | DeLuca | 361/124 |
| 4,074,337 | 2/1978 | Debortoli et al. | 361/124 |

*Primary Examiner*—Patrick R. Salce
*Attorney, Agent, or Firm*—Trexler, Wolters, Bushnell & Fosse, Ltd.

[57] ABSTRACT

A line protector for a communications circuit provides overvoltage and overcurrent protection. The overvoltage protection is effected through an arrester that provides an arc gap from the line to ground. For overcurrent protection a fusible element is melted by a heat coil causing a conductive cup to move into engagement with a conductive plate that is connected to a line pin, thereby forming a direct metallic shunt to ground. The heat coil assembly, the line pins, and the contact plates associated with the line pins are mounted on a dielectric sub-base which in turn is supported by the base of the protector. The ends of the heat coil are welded to the contact plates and the line pins are staked to the contact plates, thereby eliminating noise-causing butt contact connections in the line circuit.

6 Claims, 5 Drawing Figures

LINE PROTECTOR FOR A COMMUNICATIONS CIRCUIT

BACKGROUND OF THE INVENTION

This invention relates to improvements in line protectors of the type that are located between central office switching equipment and inside switching related equipment. These protectors serve to protect the inside equipment from damage as a result of overvoltage and overcurrent conditions on the outside lines. Examples of such protectors are shown in U.S. Pat. No. 3,743,888 issued July 3, 1973; U.S. Pat. No. 3,573,695 issued Apr. 6, 1971; U.S. Pat. No. 3,587,021 issued June 22, 1971; U.S. Pat. No. 3,255,330 issued June 7, 1966 and U.S. Pat. No. 3,849,750 issued Nov. 19, 1974. More particularly, the present invention is an improvement in the line protector of the type shown in the aforesaid U.S. Pat. No. 3,849,750. Such line protectors are commonly referred to in the art as central office protectors.

Many protectors of the foregoing type employ a heat coil responsive to over current conditions in the line to cause a fusible solder element to melt and thereby allow a spring to bring a pair of contacts together and form a direct metallic circuit from the protected line to ground. Because the heat coil is directly in the line circuit there sometimes tends to be noise on the line during normal operating conditions due to one or more surface-to-surface contacts of components in the line circuit within the protector. These surface-to-surface components tend to become contaminated in some cases despite efforts to shield or enclose fully the interior mechanism of the protector. The collection of dust and the presence of corrosive elements in the atmosphere all contribute to the creation of noisy contacts where the interfaced terminations are provided by simple abutting contact even if the contacts are under the influence of spring pressure.

SUMMARY OF THE INVENTION

The invention provides for a line protector having a heat coil circuit in the line and wherein the heat coil circuit has welded or staked terminations rather than abutting contacts under spring pressure or like non-permanent interfaced terminations. The result is that the heat coil circuit is substantially free of noise for the life of the protector unit.

Accordingly, the line protector has an insulating base, line terminals and a ground terminal on the base, means forming a line circuit between said line terminals, means providing a direct metallic current path from said line circuit to said ground terminal in the event of an overcurrent condition in said line; said last-named means including a metallic member, a heat coil around said metallic member, an element fusible by heat from said heat coil upon occurrence of said overcurrent condition, and a spring opposed by said fusible element except upon a fusing thereof to effect the formation of said direct metallic path; said heat coil forming a part of said line circuit, a contact connected to one of said line terminals and one end of the heat coil, and an additional contact connected to the other line terminal and to the other end of said heat coil and to said metallic member, said contacts being rigidly joined to the respective heat coil ends and also being rigidly joined to the respective terminals, thereby to eliminate unsecured abutting electrical connections in the line circuit between the line terminals.

The line protector may be further characterized as comprising an insulating member having conductive line pins projecting therefrom, a first conductive element rigidly secured to one of said line pins and a second conductive element rigidly secured to the other line pin, said conductive elements being supported by the insulating member and each conductive element and its associated pin being electrically insulated from the other conductive element and its associated pin, a heat coil assembly having telescoping portions rigidly secured together by a fusible substance, a coil of wire surrounding said telescoping portions and having one end of the coil bonded to one conductive element and the other end of the coil bonded to the other conductive element, thereby to form a protector circuit between the line pins and wherein the heat coil generates heat to melt the fusible substance upon an overcurrent condition in the line, and wherein one of the said telescoping portions is rigidly secured to one of said conductive elements.

Preferably, this bonding and rigid securing or rigid joining between the conductive elements or contacts and both the heat coil ends and the line pins or terminals is such as to render all of these connections gas tight, so as to insure their integrity in maintaining good conductive contact therebetween.

DETAILED DESCRIPTION

Figure 1:
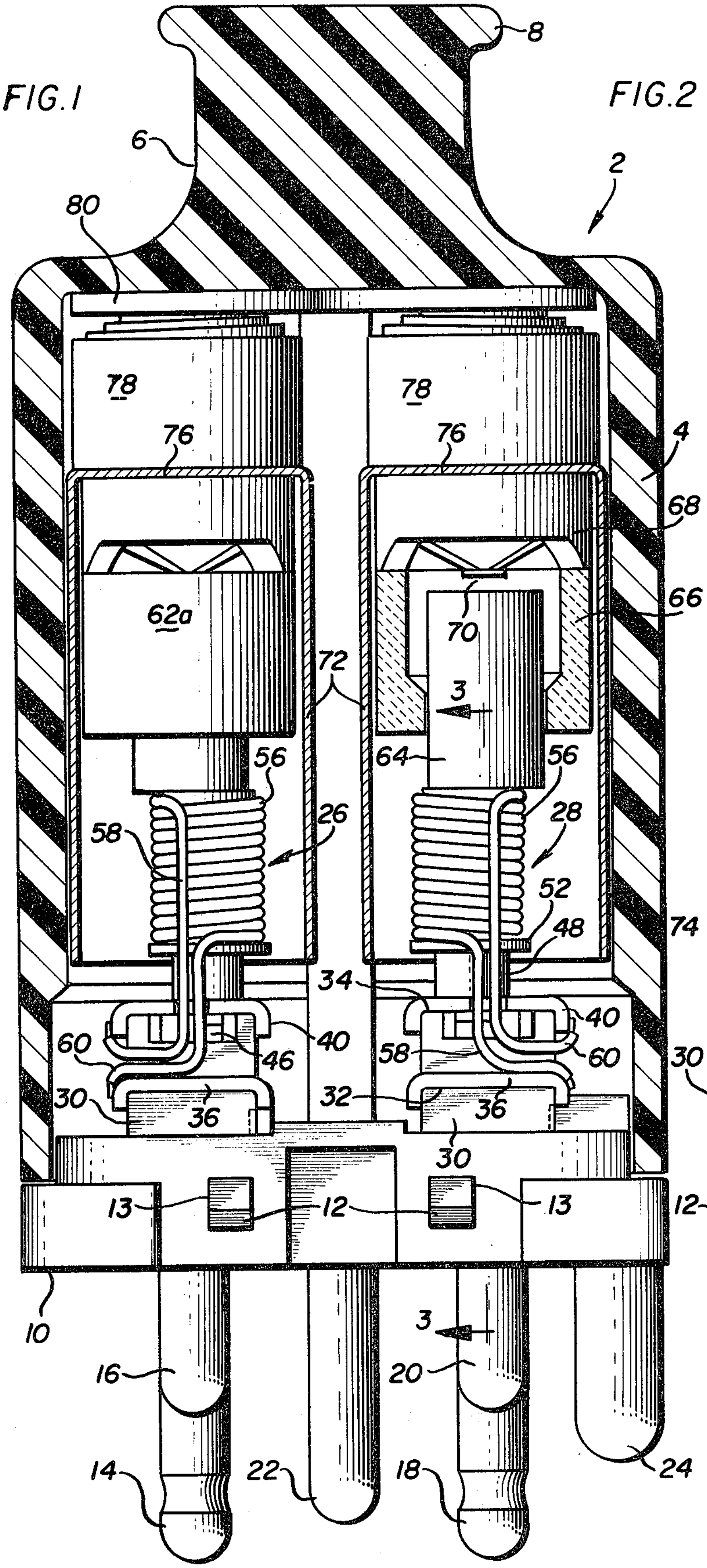
FIG. 1 is a front elevational view, partially in section, of a line protector constructed in accordance with the present invention.
Figure 2:
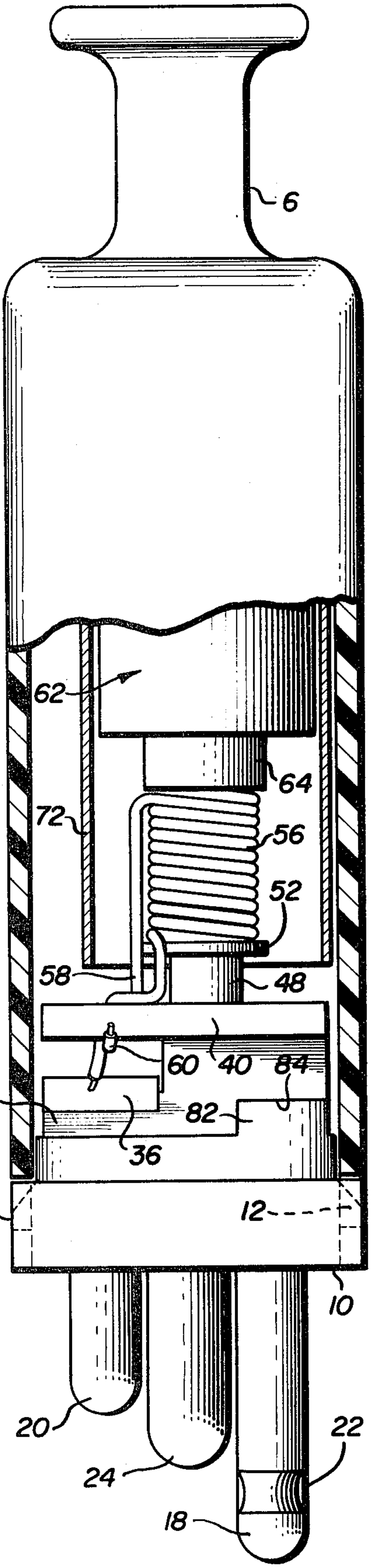
FIG. 2 is a side elevational view of a protector partially broken away and in section.

Referring now in more detail to the drawing there is shown a protector 2 having a generally rectilinear insulating plastic housing. The upper end of the housing 4 has a neck portion 6 that terminates in a flange 8 by which the protector may be gripped for removal from and placement into a plug-in type terminal board having wired connections to the incoming outside lines and also to the inside or central office equipment. At its lower end the housing is closed off by a plastic base 10 containing a plurality of laterally projecting tabs 12. These tabs 12 interlock with a snap fit into openings 13 that are formed on the two wider opposite walls of the housing 4 adjacent to the resilient lower open end of the housing.

Projecting downwardly and through the base 10 is a series of conductive plug-in terminal pins 14, 16, 18, 20 and 22. There is a first line pin 14, a shorter first central office pin 16, a second line pin 18, a shorter second central office pin 20, and a ground pin 22. There is also a polarizing pin 24 which is a plastic dummy pin intergrally molded with the base 10 and insures proper orientation of the protector when it is plugged into its receptacle.

The first line pin 14 and the first central office pin 16 are components in one of the lines (tip or ring) through the protector while the second line pin 18 and the second central office pin 20 are components in the other line through the protector. The ground pin 22 is suitably connected through the plug-in receptacle to ground in a known manner.

Running from the line pin 14 to the line pin 16 is a heat coil circuit 26, and similarly running between the line pin 18 and the line pin 20 is a like heat coil circuit 28. These heat coil circuits are of similar construction; hence only the circuit 28 will be described, it being understood that like reference numerals as may appear in the circuits 26,28 refer to similar parts. Each heat coil circuit is characterized by the fact that there are rigid or permanent connections from one line pin (e.g. 18) to the other line pin (e.g. 20). These connections are preferably effected by staking the line pins to contact plates and by welding the ends of the heat coil to the respective contact plates.

A sub-base 30 of insulating plastic is of generally rectilinear configuration but includes a lower step or surface 32 and an upper step or surface 34. The lower step 32 receives a metallic contact plate 36 which is of U-shape cross section as seen in FIG. 1. The plate 36 has a hole 37 for receiving the upper small end of the pin 20 which is upset or staked into rigid and permanent mechanical and electrical contact with the plate 36. The hole 37 in the plate 36 in aligned with a hole 38 in the sub-base 30 for receiving an intermediate sized section of the downwardly projecting pin 20.

A second contact plate 40 also of U-shaped cross section is supported by the upper step 34. The plate 40 overhangs or projects beyond the upper step 34 so as to lie spaced above the plate 36. The overhanging part of the plate 40 has a slot 42 for purposes presently more fully appearing. The upper small diameter end of the line pin 18 projects through the plate 40 and is upset or staked in place to provide a rigid and permanent mechanical and electrical connection therewith. The line pin 18 also projects through a hole 44 in the sub-base 30 such that the two pins 18, 20 are in parallel relationship. The pins 18, 20 also pass freely through holes 21, 23 in the base 10.

Figure 3:
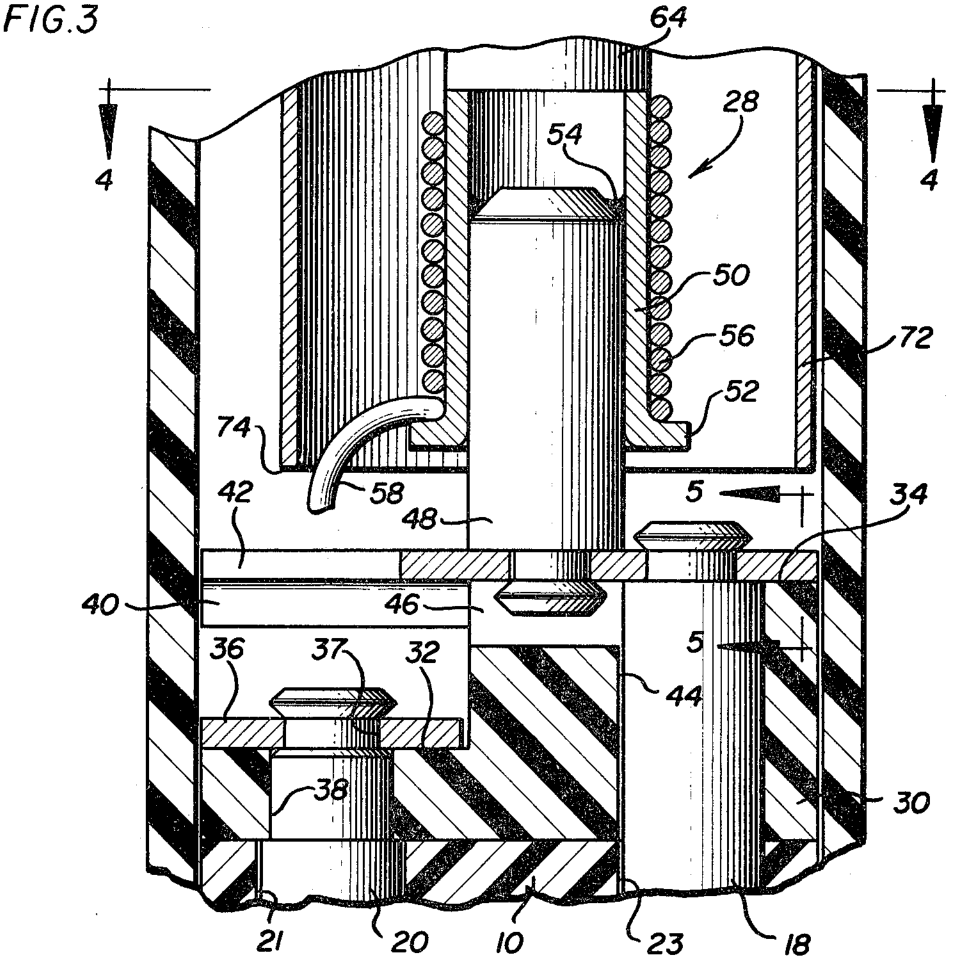
FIG. 3 is a fragmentary sectional view taken approximately along line 3—3 of FIG. 1.
Figure 4:
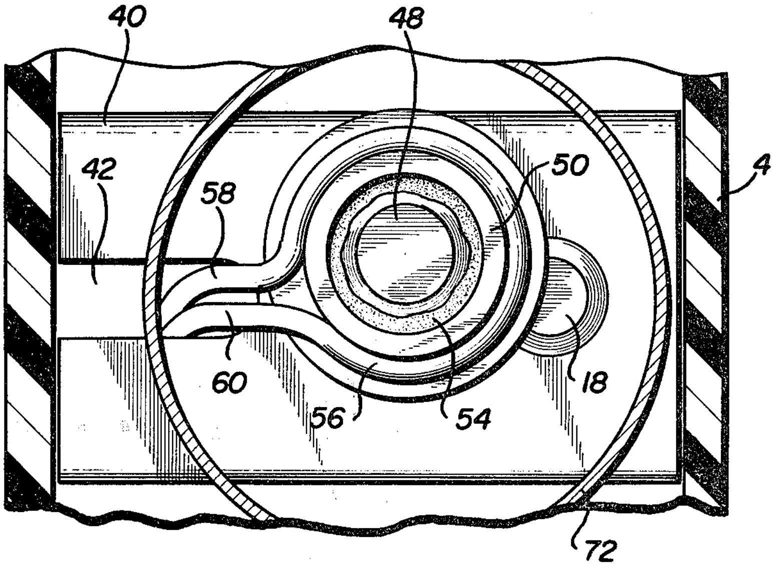
FIG. 4 is a fragmentary sectional view taken along line 4—4 of FIG. 3.

The upper step 34 has an upwardly and laterally opening cavity 46 for accommodating the reduced diameter lower end of a heat coil pin 48. This cavity 46 may extend into or merge with the hole 44, as best shown in FIG. 3. The heat coil pin 48 projects perpendicularly upwardly from the plate 40 such that its central axis is approximately the central axis of the subassembly comprising the sub-base 30, the pins 18, 20 and the contact plates 36, 40.

The heat coil pin 48 telescopes within a tubular metallic member constituting a heat coil bobbin 50 having a lower flanged end 52. The heat coil pin 48 and the bobbin 50 are normally maintained in rigid assembled relationship by a low melting point solder 54 at the upper end of the pin 48. Some of the solder may wick downwardly as a film between the pin 48 and the inside surface of the bobbin 50. A heat coil 56 is wound around the exterior of the bobbin 50 and is retained by the end flange 52. The axial length of the heat coil 56 is preferably such that it extends above the fusible solder 54. The leads 58, 60 at the opposite ends of the heat coil winding pass through the slot 42 and are rigidly joined respectively to the plates 36, 40. The ends of the leads 58, 60 are stripped of insulation and may be bonded to the respective plates 36, 40 in any suitable permanent manner, preferably by welding. Consequently, these welded connections plus the staked connections of the pins 18, 20 to the respective plates 36, 40 result in a protective heat coil circuit between the line pins 18, 20 which eliminates spring-pressed or like abutting connections of a non-rigid or non-permanent nature.

Advantageously, the described connections between the pins 18 and 20, the plates 36 and 40, as well as the rigid joining of the leads 58, 60 with the plates 36, 40, achieve gas-tight connections therebetween. By this is meant that these connections are in intimate metal to metal contact, substantially impervious to the intrusion of gas, air or the like, which might otherwise cause oxidation, etc. of the contacting metal surfaces, impairing the integrity of the electrical contact therebetween. Accordingly, the staking and welding of the illustrated embodiment, as described above, gives such rigid or "gas-tight" connections.

Also mounted within the housing 4 and associated with the line circuit running from the pin 18 to the pin 20 is an overvoltage arrester unit 62 of known construction. A like arrester unit *62a* is associated with the line circuit running from the pin 14 to the pin 16. The arrester unit 62 or *62a* comprises a carbon rod electrode 64, the lower end of which abuts the upper end of the heat coil bobbin 50, thus providing a connection to the line circuit. It will be noted from FIG. 3 that the upper end of the heat coil bobbin is spaced substantially from the upper end of of the bobbin pin 48. The arrester unit 62 also includes a ceramic insulator 66 to which the carbon rod 64 is bonded. Cooperating with the carbon rod electrode is a carbon disc electrode 68 which seats against the upper end face of the insulator 66. The end of the carbon rod that faces the disc 68 is recessed into the insulator so as to define with the disc 68 an arc gap 70. The disc 68 is of known construction and may be either flat across its face or preferably of a construction shown in U.S. Pat. No. 4,013,927 that issued Mar. 22, 1977. In place of a carbon arrester, a gas tube surge arrester may be used in the manner shown by aforesaid U.S. Pat. No. 3,849,750.

The overvoltage arrester unit is housed within an inverter metallic cup 72 which also receives the heat coil bobbin 50. The lower open end 74 of the cup 72 is spaced from the plate 40 a distance which is less than the distance from the upper end of the bobbin pin 48 to the lower end of the carbon rod 64.

Interposed between the end wall 76 of the cup 72 and the upper end of the housing 4 is a volute spring 78. This volute spring 78 applies pressure to the cup 72 which in turn presses the carbon rod electrode 64 against the bobbin 50; however the bobbin stays fixed relative to the pin 48 so long as the fusible solder material 54 remains solid.

The upper end of the volute spring 78 presses against a grounding plate 80 which is positioned againt the upper closed end of the housing 4. The grounding plate 80 is of such extent that it contacts both volute springs 78, 78 that are associated with the respective line circuits. The grounding plate is metallic and is staked or otherwise rigidly secured to the ground pin 22 which runs downwardly between the assemblies (heat coil circuit, arrester) in each half of the housing so as to project through the base 10. The construction and arrangement of the grounding pin and ground plate may be similar to that shown in the aforesaid U.S. Pat. No. 3,849,750.

In a transient overvoltage condition in one of the lines, for example the line in which pins 18 and 20 are located, the voltage will be applied through line pin 18, plate 40, heat coil pin 48 and bobbin 50 to the carbon rod electrode 64. This voltage will cause an arc across the gap 70 to the disc 68 and conduction through the cup 72, volute spring 78, ground plate 80 and ground pin 22 to ground. Under such conditions the unit is generally self-restoring, requiring no attention of service personnel.

In an overcurrent conditon in the line circuit between pins 18 and 20 the heat coil 56 will generate sufficient heat to melt the solder 54 whereby the pressure from the volute spring 78, transmitted through to the carbon rod 64, will press against the bobbin 50 causing it to slide downwardly along the pin 48. The action of the spring 78 will also move the metallic cup 72 downwardly until its lower end 74 engages the upper plate 40. The electrical contact between the cup 72 and the plate 40 will immediately ground the line through the ground pin 22.

In assembling the protector the smaller diameter end of the pin 20 is inserted into the hole 38 from the lower side of the sub-base 30 and the plate 36 is seated on the step 32. Thereafter, the small diameter end of the pin 20 is staked over so as to clinch the pin 20 to the plate 36 and maintain those parts firmly assembled with the sub-base 30. The U-shaped cross section of the plate 36 facilitates in the location of the plate 36 during the assembly process. Additionally, the small diameter end of the longer pin 18 is inserted into the plate 40 from its lower side and the smaller diameter end of the pin 18 staked in place. The smaller diameter end of the coil pin 48 is inserted through the plate 40 from the top side thereof and staked over to hold the pin rigidly in place. Thereafter the bobbin 50 is telescoped with the pin 48 and the two are secured together by the solder 54.

Figure 5:
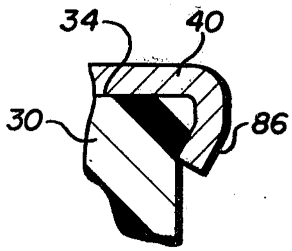
FIG. 5 is a fragmentary sectional view taken along line 5—5 of FIG. 3.

The assembled bobbin 50, pin 48, plate 40 and pin 18 are then assembled with the sub-base 30 by inserting the larger diameter part of the pin 18 through the upper end of the hole 44. The U-shaped cross section of the plate 40 facilitates in seating the plate onto the upper step 34. At that time the plate 40 may be crimpled along its longitudinal margins 86,86 as best seen in FIG. 5 wherein one of the margins 86 is shown. This crimping may be done by any suitable tool. Thereafter, the heat coil 56 may be wound on the bobbin 50 leaving the leads 58,60 of such length as to be passed through the slot 42. The lead 58 may be welded to the plate 40 while the lead 60 may be welded to the plate 36.

The sub-base 30 with the components assembled thereon may be mounted on the base 10 by passing the pins 20,18 through holes 21,23 in the base. Proper orientation of the sub-base is provided for by an upstanding rib 82 on the base 10 which mates with a recess 84 on the sub base 30. Should the sub base be assembled with the pin 18 in hole 21 for example, the rib 82 and recess 84 will not mate, thereby indicating an improper assembly. Each sub-base 30 and its associated components is separately assembled with the base 10. The assembled base and two sub-bases 30,30 may then be assembled with the arrestor unit 62, the cup 72, volute spring 78 and ground plate 80 with ground pin 22 in a known manner similar to that described in the aforesaid U.S. Pat. No. 3,849,750 such that components of the protector unit for each line are in coaxial relationship.

The invention is claimed as follows:

1. A line protector for a communications circuit having an insulating base, line terminals and a ground terminal on said base, means forming a line circuit between said line terminals, means providing a direct metallic current path from said line circuit to said ground terminal in the event of an overcurrent condition in said line; said last-named means including a metallic member, a heat coil and an element fusible by heat from said heat coil upon occurrence of said overcurrent condition, and a spring opposed by said fusible element except upon fusing thereof to effect the formation of said direct metallic path; said heat coil forming part of said line circuit, a contact connected to one of said line terminals and to one end of the heat coil, and an additional contact connected to the other line terminal and to the other end of said heat coil, said contacts being rigidly joined to the respective heat coil ends and also being rigidly joined to the respective terminals, thereby to eliminate unsecured abutting electrical connections in the line circuit between the line terminals, said contacts being plates between the heat coil and the base, said line terminals being pins secured to the plates, said pins and plates being supported on an insulating sub-base which is in turn supported on the base, said pins passing through the sub-base such that the sub-base along with the pins, the plates and the heat coil forms a sub-assembly.

2. A line protector according to claim 1 in which one of the plates has a slot for receiving the leads of the heat coil.

3. A line protector for a communications circuit comprising an insulating member having step surfaces, conductive line pins projecting from said respective step surfaces, a first conductive element rigidly secured to one of said line pins and second conductive element rigidly secured to the other line pin, said conductive elements being respectively supported by the step surfaces and each conductive element and its associated pin being electrically insulated from the other conductive element and its associated pin, a heat coil assembly having telescoping portions rigidly secured together by a fusible substance, a coil of wire surrounding said telescoping portions and having one end of the coil bonded to one conductive element and the other end of the coil bonded to the other conductive element, thereby to form a protector circuit between the line pins and wherein the coil generates heat to melt the fusible substance upon an overcurrent condition in a communications line circuit in which the protector circuit is a part, and one of said telescoping portions being rigidly secured to one of said conductive elements, the conductive elements being between the heat coil and the insulating member.

4. A line protector according to claim 3 in which said conductive elements are plates to which said pins and said one telescoping portion are respectively staked.

5. A line protector according to claim 4 in which the bonds of the ends of the coils to the plates are by welding.

6. A line protector according to claim 3 in which the pins pass through the insulating member.

* * * * *